United States Patent [19]

Agarwal et al.

[11] Patent Number: 4,937,740

[45] Date of Patent: Jun. 26, 1990

[54] REAL TIME SOFTWARE ANALYZING SYSTEM FOR STORING SELECTIVE M-BIT ADDRESSES BASED UPON CORRESPONDINGLY GENERATED N-BIT TAGS

[75] Inventors: Nirmal K. Agarwal; Bruce J. Ableidinger, both of Beaverton, Oreg.

[73] Assignee: Cadre Technologies, Inc., Beaverton, Oreg.

[21] Appl. No.: 161,284

[22] Filed: Feb. 29, 1988

Related U.S. Application Data

[63] Continuation of Ser. No. 777,216, Sept. 18, 1985, abandoned.

[51] Int. Cl.[5] .................. G06F 11/34; G06F 7/02
[52] U.S. Cl. .................................. 364/200; 364/267; 364/267.2; 364/260.6; 364/261; 371/19
[58] Field of Search ... 364/200 MS File, 900 MS File, 364/486, 580; 371/19; 324/73 R

[56] References Cited

U.S. PATENT DOCUMENTS

| | | | |
|---|---|---|---|
| 4,425,643 | 1/1984 | Chapman et al. | 371/20 |
| 4,445,192 | 4/1984 | Haag et al. | 364/900 |
| 4,497,022 | 1/1985 | Cormier et al. | 364/200 |
| 4,511,961 | 4/1985 | Penton | 364/200 |
| 4,513,395 | 4/1985 | Henry et al. | 364/900 |
| 4,514,835 | 4/1985 | Bottigheimer et al. | 368/118 |
| 4,554,632 | 11/1985 | Nygaard, Jr. et al. | 364/300 |
| 4,574,351 | 3/1986 | Dang et al. | 364/200 |
| 4,598,364 | 7/1986 | Gum et al. | 364/200 |
| 4,623,984 | 11/1986 | Yokokawa et al. | 364/900 |
| 4,636,940 | 1/1987 | Goodwin, Jr. | 364/200 |
| 4,651,298 | 3/1987 | Currier, Jr. | 364/900 |
| 4,692,897 | 9/1987 | Crabbe, Jr. | 364/900 |
| 4,752,928 | 6/1988 | Chapman et al. | 371/20 |

OTHER PUBLICATIONS

A Modular Analyzer for Software Analysis in the 6400 System, Authors: Richard A. Nyggard, Jr., Fredrick J. Palmer, Bryce S. Goodwin, Jr., Stan W. Bowlin, and Steven R. Williams, Hewlett-Packard Journal, Mar., 1983, pp. 16–23.

*Primary Examiner*—Thomas C. Lee
*Attorney, Agent, or Firm*—Chernoff, Vilhauer, McClung & Stenzel

[57] ABSTRACT

A software analysis system for acquiring, storing, and analyzing certain predetermined characteristics of a computer program includes a method and apparatus for acquiring certain lines of high-level language instruction code without the need for statistical sampling. Each line of instruction code generates at least one address in assembly language which is encoded with a tag and stored in a first-in, first-out memory. The memory output is asynchronous with its output such that tagged addresses are stored in real time but extracted from memory at a predetermined rate. This allows the system to acquire all software event of interest. Each tagged address is also marked with a time stamp so that the time between acquisition of each of the software events of interest may be analyzed to determine, for example, the length of time spent in a particular subroutine.

12 Claims, 1 Drawing Sheet

REAL TIME SOFTWARE ANALYZING SYSTEM FOR STORING SELECTIVE M-BIT ADDRESSES BASED UPON CORRESPONDINGLY GENERATED N-BIT TAGS

This application is a continuation of application Ser. No. 777,216, filed Sept. 18, 1985, now abandoned.

BACKGROUND OF THE INVENTION

The present invention relates to a software analysis system for real time analysis of certain characteristics of computer programs to be run on data processing systems.

Data processing systems, which are controlled by microprocessors, execute computer programs having sometimes thousands of lines of instruction code. In more complex data processing systems the instruction code may be in the form of a high-level language such as, Pascal, FORTRAN, COBOL, or ADA as well as other high-level languages which resemble English. For each such line of high-level instruction code there may be a large number of machine-language instructions in a lower level code that are generated by the data processing systems compiler. The compiler translates high-level language commands into machine or assembly language. Each machine-language instruction has an address which corresponds to one of a plurality of possible addresses within the address space of the data processing system's microprocessor. During the execution of a particular computer program, many different addresses will be utilized and the frequency of these addresses, if known, may provide information as to how efficiently the computer program operates.

Since there may be thousands of lines of high-level instruction code needed in order to execute a particular computer program, such computer programs may not be written in the most efficient manner, thus requiring the microprocessor to execute a large number of steps when the desired operation could be accomplished with a fewer. In order to analyze the efficiency of a particular computer program, it is desirable to know which addresses within the microprocessor are being called most frequently. Clues to the operation of the program may also be derived from the timing between successive uses of certain microprocessor addresses or the frequency which with particular microprocessor address or range of addresses is called. For example, by choosing two addresses that correspond to the entry and exit points of a software subroutine, one may determine the length of time needed to execute the subroutine. It may be found that it takes longer to execute the subroutine than originally thought, thus indicating that the subroutine does not make the most efficient use of the microprocessor's time. This may lead a software engineer to redesign the program to execute the subroutine faster. It may also be important to discover whether a particular address is being called within a subroutine since the absence of that address may indicate the presence of a bug in the program.

Diagnostic test devices known generally in the industry as logic analyzers have been used in the past for debugging computer programs. A logic analyzer frequently includes a probe which is connected in parallel with the microprocessor in the system under test or "target" microprocessor to probe signals intended for the microprocessor. The logic analyzer acquires the information present on every microprocessor bus cycle and stores it in its own local memory. However, since the storage of information occurs every bus cycle and the information is in assembly language, the number of equivalent high-level language statements or events which can be stored in the memory of a logic analyzer is very small, typically less than ten or twenty for a total logic analyzer memory depth of 1000. This is due to the fact that each line of high-level language instruction code may require 10-100 bus cycles of machine code to execute it. The bus cycle information must be removed from the logic analyzer's memory to make room for new incoming information. Since the logic analyzer's events of interest occur on every bus cycle of the microprocessor, the information is stored in memory at such a high rate that it is impossible to process the information in real time. Thus, in order to analyze the data which is being stored at such a high rate of speed a logic analyzer resorts to statistical sampling. This results from the fact that the logic analyzer's random access memory (RAM) cannot store data and send for data for analysis at the same time. When the data in the logic analyzer's RAM is being read the processing takes place at a much slower rate than the incoming data. This means that large blocks of instruction code must be ignored and only samples of the program are acquired for analysis. Thus, the logic analyzer cannot acquire every single event of interest that might occur in the execution of a particular computer program.

SUMMARY OF THE INVENTION

The present invention provides a software analysis system which processes data corresponding to certain predetermined characteristics of a computer program in real time so that all events of interest may be acquired, stored, and analyzed. The acquisition of events of interest in real time obviates the need for sampling and statistical sampling analysis and also provides a means for determining, not only how often certain software events are encountered, but whether they are encountered at all even once in the execution of the program.

The software analysis system of the present invention includes a probe which is adapted to be connected to a target microprocessor. The probe is operative to receive signals intended for the target microprocessor while the computer program is being executed by a data processing system. Connected to the probe is a data acquisition circuit which acquires each occurrence of preselected lines of coded instructions within the computer program. As each of the preselected lines is acquired, a timer or counter is reset then started to provide each acquisition with a timing index from which the length of time between two acquisitions may be determined.

The acquisition circuit includes a tag generator for marking each preselected software event with an identifying code. Each software event of interest will be characterized by at least one address which will be intercepted by the probe. This address may include as many as 24 bits. The tag generator condenses this 24-bits into an 8-bit code and stores the 8-bit code in a first-in, first-out memory (FIFO) which may be a random access memory. Since the particular address of interest may represent only one of a plurality of assembly language instructions relating to the higher level language instruction code, other addresses may be ignored thus permitting the encoding and storage of only these events of interest in real time. As each of the encoded tags is stored in the FIFO RAM a counter is initiated which provides relative timing information between the tagged addresses.

The output of the FIFO is asynchronous with its input; that is, data is extracted from the FIFO at a controlled rate whereas the acquisition of tagged addresses by the FIFO occur in real time at the rate at which they are provided to the acquisition circuit. Thus, each event of interest in the computer program may be acquired and analyzed. This permits the determination of time required for execution of certain subroutines or the frequency of occurrence of certain addresses.

In yet another mode of operation the tag generator may be reconfigured to provide a plurality of address space windows for the storage of any address falling within predetermined address ranges. In this way it may be determined if a particular address or range of addresses is ever used when the program is executed. In this mode an address acquisition sets a binary 1 within the selected address space indicating that the particular address has occurred. For each subsequent acquisition of the address the contents of the address space do not change since it is only the first occurrence of the preselected address, that is, whether it occurred at all, even once in the program, that is important.

After this data has been acquired the particular addresses of interest may be analyzed and displayed by virtually any type of conventional display means under the control of a host computer.

It is a primary object of this invention to provide a software analysis system for accurately analyzing and debugging computer programs which are executed on microprocessor-based data processing systems.

A further object of this invention is the acquisition in real time of all events of interest within a computer program.

A still further object of this invention is to provide a software analysis system which obviates the need for statistical sampling of lines of instruction code in a computer program to analyze the performance of the program.

A still further object of this invention is to provide a means whereby it may be determined whether or not certain events occurred within a computer program while it was being executed on a data processing system.

A still further object of this invention is to provide an analysis system capable of tracking each and every high-level language statement of interest in a computer program.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 2 is a schematic block diagram of the tag generator of FIG. 1.

DETAILED DESCRIPTION OF THE INVENTION

Figure 1:
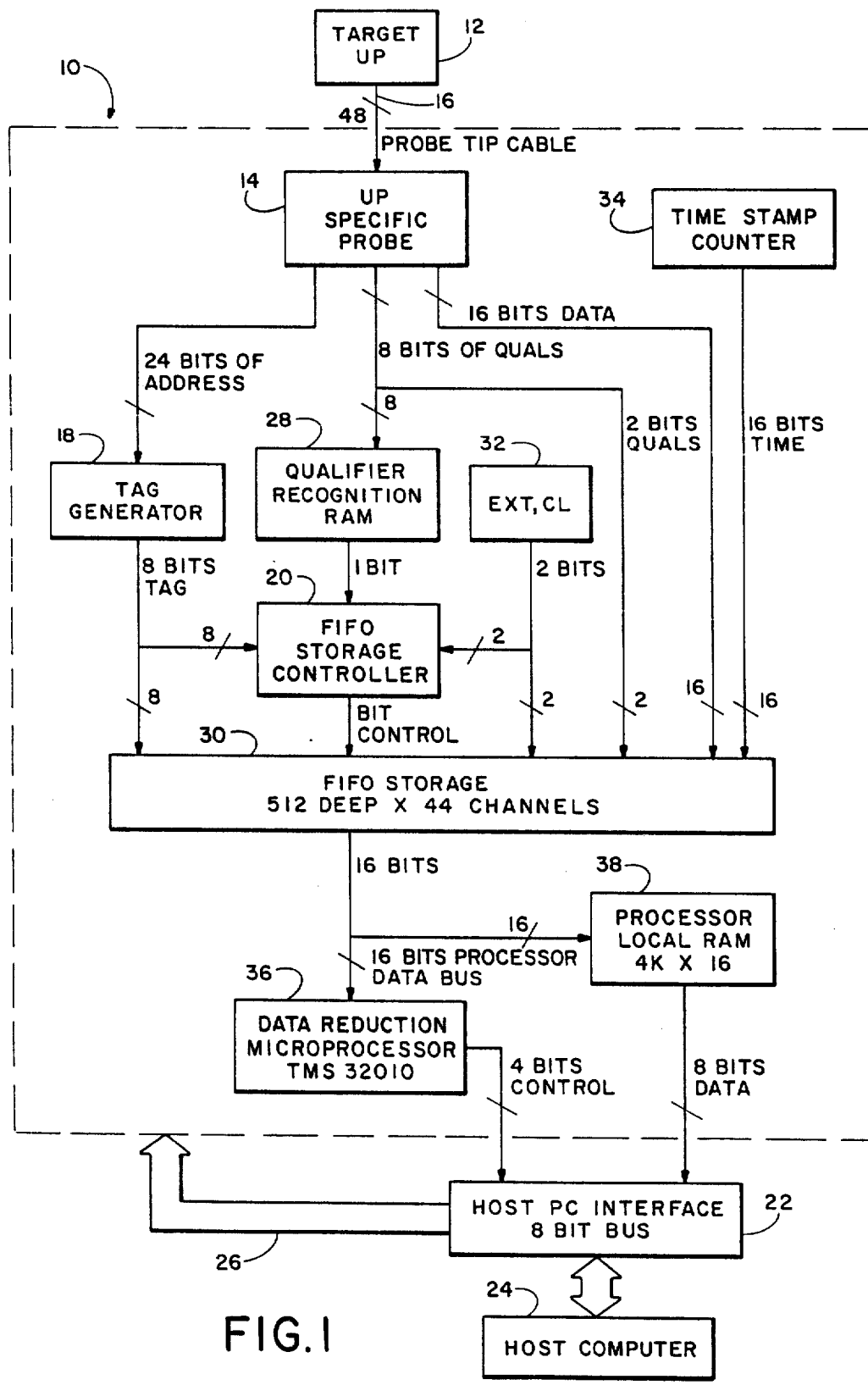
FIG. 1 is a schematic block diagram of the software analysis system of the present invention.

A software analysis system 10 is connected to a target microprocessor 12 which is part of a data processing system which executes computer programs formulated as lines of high-level language instruction code. The target microprocessor 12 is connected to a microprocessor-specific probe 14 by way of a probe tip cable 16. This includes in line 16 24 bits of address, 8 bits of qualifiers, 16 data bits, and 7 clocks.

The 24 bits of address are provided to tag generator 18 which condenses the 24-bit address into an 8-bit tag which is provided to FIFO storage controller 20. The tag generator 18 is under the control of the host PC interface 22 which connects to a host computer 24. The host computer, in turn, controls the software analysis system 10 by way of control bus 26. Control bus 26 is shown in FIG. 1 as being connected to the system 10 as indicated by the dashed line. It should be understood that virtually every functional circuit block within the dotted line is connected to the host PC interface 22 via bus 26. Thus, the particular addresses that are to be tagged by the tag generator 18 are set by the host computer. For example, a line of instruction code representing the entry of a subroutine may include 20 assembly language instructions, but the first of these uniquely identifies the particular instruction code. This assembly language instruction is located at the first address which must be provided to the tag generator 18 to be tagged as a software event of interest, thus obviating the need to consider the other 19 lines of assembly language code.

The 8-bit tag is generated by combining various bits of the 24-bit address in a set of staggered static RAMs. Thus, the 8-bit tag is a unique coded representation of a 24-bit address. For example, there may be three static RAMs which process the 24 bit addresses instages. As shown in FIG. 2, static RAM 11 accepts the twelve highest order bits (Nos. 12 through 23) and generates an 8 bit code which is an intermediate tag. This forms the input to the upper 8 address inputs of static RAM 13. A second group of bits (Nos. 6 through 11) forms the input to the lower address lines. Static RAM 13 generates a second intermediate code having 8 bits for connection to the upper 8 address inputs of static RAM 15. Static RAM 15 also accepts the input on its lower address lines from address bits Nos. 0 through 5. Static RAM 15 then generates the final 8 bit code which is a tag for the original 24 bit address. Thus there may be as many as 255 addresses which may be acquired for analysis and study. The remaining address is a general address which collects all other events which are not of interest. To further refine the nature of the addresses which may be acquired and encoded in the tag generator 18 a qualifier recognition RAM 28 set up by the host PC interface 22 determines whether the particular address includes the right type of qualifiers. The qualifier lines which comprise eight bits of information, indicate whether the address intercepted by the probe 14 is a memory read/write, 10 read/write, or an interrupt or acknowledge signal or other type of qualification which identifies its particular function. This type of circuit is standard in logic analyzers, and its method of operation is understood by those skilled in the art.

If the address under consideration by the tag generator 18 is of the proper functional type as decided by qualifier recognition RAM 28, a 1-bit signal will be provided to a FIFO storage controller 20 which will tell the controller 20 to accept the 8-bit tag from tag generator 18 and this generates a 1-bit control for FIFO storage 30 which is 512 words deep × 44 bits wide. Included in the 44 bits are two external control lines, called external and crosslink 32 which can find the system to an external instrument.

A time stamp counter 34 is also under control of the host computer 24 and provides a 16-bit time signature which is stored along with each storage of an 8-bit tag from tag generator 18. The count that has elapsed since the last tag was stored comprises the information that is stored with each new tag. The time stamp counter 34 is a 16-bit floating point counter which has 12 bits of mantissa and 4 bits of exponent. The clock for counter 34 may be selected to have a time resolution of 200 ns, 1 ms, 10 ms, or 100 ms. The 16-bit time count stored along with the tag the FIFO storage 30 may be converted by the data reduction microprocessor 36 into a linear time number which can be used later for all time calculations and storage. Counter 34 has a wide range and is thus capable of providing time measurements from minutes and seconds down to nanoseconds to take into account the wide variation in time between software events of interest.

The FIFO storage 30 is the storage area for the data bus of the target microprocessor 12. This data will later be stored by data reduction processor 36 in local RAM 38. The FIFO storage 30 consists of five FIFO chips each 512×9 connected in parallel, thus providing a total storage space 512 by 45 bits. These 512 data locations act as data storage buffers in which one end may store bursts of data (tags) arriving in real time and the other end may provide data to the data reduction microprocessor 36 at a predetermined rate. Thus, input and output ports are completely asynchronous and the FIFO storage technique employed acts as a data rate averager. The storage of data in the local processor RAM 38 is controlled by the data reduction microprocessor 36. The storage rate is normally fast enough to keep pace with the input to the FIFO storage RAM 30. This is because the input data is so highly qualified that the rate at which data is provided to the FIFO storage by FIFO storage controller 20 is slow enough that the data may be stored in the processor local RAM 38 which keeps the FIFO 30 from ever completely filling up. This allows the input of FIFO storage 30 to remain open indefinitely and to acquire every single event of interest in the software program. With storage occurring in real time, no events of interest are missed as would be the case with statistical or sampling methods.

The tag generator 18 is capable of detecting 255 unique 24-bit addresses within an entire 16-megabyte address space or may detect a minimum of 85 address ranges or a combination of both. 255 address values are available because one of the 256 unique tag values must be reserved for every other address that is not of interest. Thus, within a particular amount of address space three tag resources, worst cast, used to detect a range. These resources detect the beginning of the range, the end of the range and middle of the range.

The FIFO storage controller 20 also include a filter for insuring that false addresses are not stored in FIFO 30. Certain microprocessors utilize prefetch queues in which addresses are fetched from memory but never executed because of intermediate Jump or Branch instructions. The filter, which includes a comparator and a down counter, requires that for certain address range types the same tag occurs a predetermined number of times (an estimate of the queue depth) before it is stored in the FIFO 30. This filters out those addresses which are called but never executed.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A software analysis system for analyzing a computer program in real time comprising:
    (a) a probe connected to a microprocessor of a data processing system for receiving first signals to and from said microprocessor representing each address generated by said data processing system during the running of said computer program, said first signals comprising m-bit addresses defining microprocessor memory locations;
    (b) tag generator means for receiving each said m-bit address from said probe and for generating for each said address an n-bit coded tag wherein m is greater than n, m and n are both position integers;
    (c) storage controller means coupled to said tag generator means for examining each said coded tag and for generating a second signal indicating whether to store a particular coded tag in memory;
    (d) first-in, first-out memory means coupled to said tag generator means for receiving said n-bit coded tags therefrom, and responsive to said second signal from said storage controller means for storing certain ones of said coded tags in said memory means at a first variable rate; and
    (e) data reduction computer means for extracting said coded tags stored in said first-in, first-out memory means in real time at a second variable rate for analysis and display.

2. The software analysis system of claim 1 where a ratio of m to n is greater than or equal to 2.

3. The software analysis system of claim 2 wherein said tag generator means comprises a set of staggered static RAMs.

4. The software analysis system of claim 1 further including time stamp counter means coupled to said first-in first-out memory means for marking each one of said digitally coded tags stored in said first-in first-out memory means with a timing code to indicate its time of occurrence.

5. The software analysis system of claim 4 further including display means couple to said first-in first-out memory means for displaying a frequency of occurrence of each of the stored coded tags and the time elapsed between the occurrence of selected ones of said stored coded tags.

6. The software analysis system of claim 1 further including qualifier recognition RAM means connected to said probe for examining portions of said computer program first signals which qualify a parameter of said addresses, and for providing a third signal to said storage controller means to indicate whether a particular address is of a type which is to be saved in said memory means.

7. In a software analyzing system having processing means and memory means, a method of analyzing by said system a computer program containing a set of coded instructions while said program is operating a data processing system which includes a microprocessor, said microprocessor having an address space, comprising the steps of:
    (a) electronically receiving signals provided to and from said microprocessor while said computer program is being executed by said data processing system;

(b) acquiring each one of said signals corresponding to addresses within said address space, said addresses containing m bits, and generating therefrom digitally coded tag signals representing said addresses by combining said m bits of each of said addresses to yield an n-bit tag where m is greater than n, m and n are both positive integers;

(c) storing predetermined ones of said digitally coded tag signals in said memory means in real time;

(d) marking each one of said digitally coded tag signals stored in said memory means with a timing code to indicate its time of occurrence; and (e) extracting said digitally coded signals from said memory means at a predetermined rate in real time for analysis or display.

8. The method of claim 7 further including as step (f):

(f) displaying the frequency of occurrence of certain ones of said digitally coded tag signals and a time elapsed between each said occurrence.

9. The method of claim 7 wherein a ratio of m to n is greater than or equal to 2.

10. In a software analyzing system having processing means and first-in first-out memory means, a method of analyzing by said system a computer program containing a set of coded instructions while said program is operating a data processing system which includes a microprocessor, said microprocessor having an address space, comprising the steps of:

(a) electronically receiving signals provided to and from said microprocessor while said computer program is being executed by said data processing system;

(b) acquiring each one of said signals corresponding to addresses within said address space, said addresses containing m bits, and generating therefrom digitally coded tag signals representing said addresses by combining said m bits of each of said addresses to yield an n-bit tag where m is greater than n, m and n are both positive integers;

(c) examining each one of said n-bit tag signals to determine whether it should be stored in memory;

(d) storing certain ones of said tag signals in said first-in first-out memory means at a first variable clock rate;

(e) simultaneously with step (d); extracting said tag signals from said first-in first-out memory means at a second variable rate for analysis or display.

11. The method of claim 10 further including the step of each examining portions of said acquired signal which qualify a parameter relating to each of said addresses to determine if each said address is of a type which is to be saved in said first-in first-out memory.

12. The method of claim 10 further including the step of displaying a frequency of occurrence of each tag signal stored in said first-in first-out memory.

* * * * *

UNITED STATES PATENT AND TRADEMARK OFFICE
CERTIFICATE OF CORRECTION

PATENT NO. : 4,937,740

DATED : June 26, 1990

INVENTOR(S) : Nirmal K. Agarwal and Bruce J. Ableidinger

It is certified that error appears in the above-identified patent and that said Letters Patent is hereby corrected as shown below:

On the title page:
In the Abstract, line 12:  Change "event" to --events--.

Col. 1, line 41:  delete "a" at the beginning of the line.

Col. 2, line 20:  delete the word "for" after "send" so sentence reads --and send data for analysis--.

Col. 4, line 29:  change "instages to --in stages--;

Col. 4, line 52:  change "10" to --IO--;

Col. 4, line 65:  change "find" to --link--.

Col. 5, line 9:  insert --in-- between "tag" and "the;"

Col. 5, line 35:  insert --30-- between "storage" and "by;"

Col. 5, line 51:  change "cast" to --case--;

Col. 5, line 51:  insert --may be-- after "case;"

Col. 5, line 54:  change "include" to --includes--.

Col. 6, line 45:  change "couple" to --coupled--.

UNITED STATES PATENT AND TRADEMARK OFFICE
CERTIFICATE OF CORRECTION

PATENT NO. : 4,937,740

DATED : June 26, 1990

INVENTOR(S) : Nirmal K. Agarwal and Bruce J. Ableidinger

It is certified that error appears in the above-identified patent and that said Letters Patent is hereby corrected as shown below:

Col. 8, line 21: move "each" to after --portion of--

Signed and Sealed this

Eleventh Day of August, 1992

Attest:

DOUGLAS B. COMER

Attesting Officer

Acting Commissioner of Patents and Trademarks